Feb. 17, 1959 W. W. PHARIS 2,874,226
TRUNK ADAPTER CIRCUIT
Filed Sept. 23, 1957
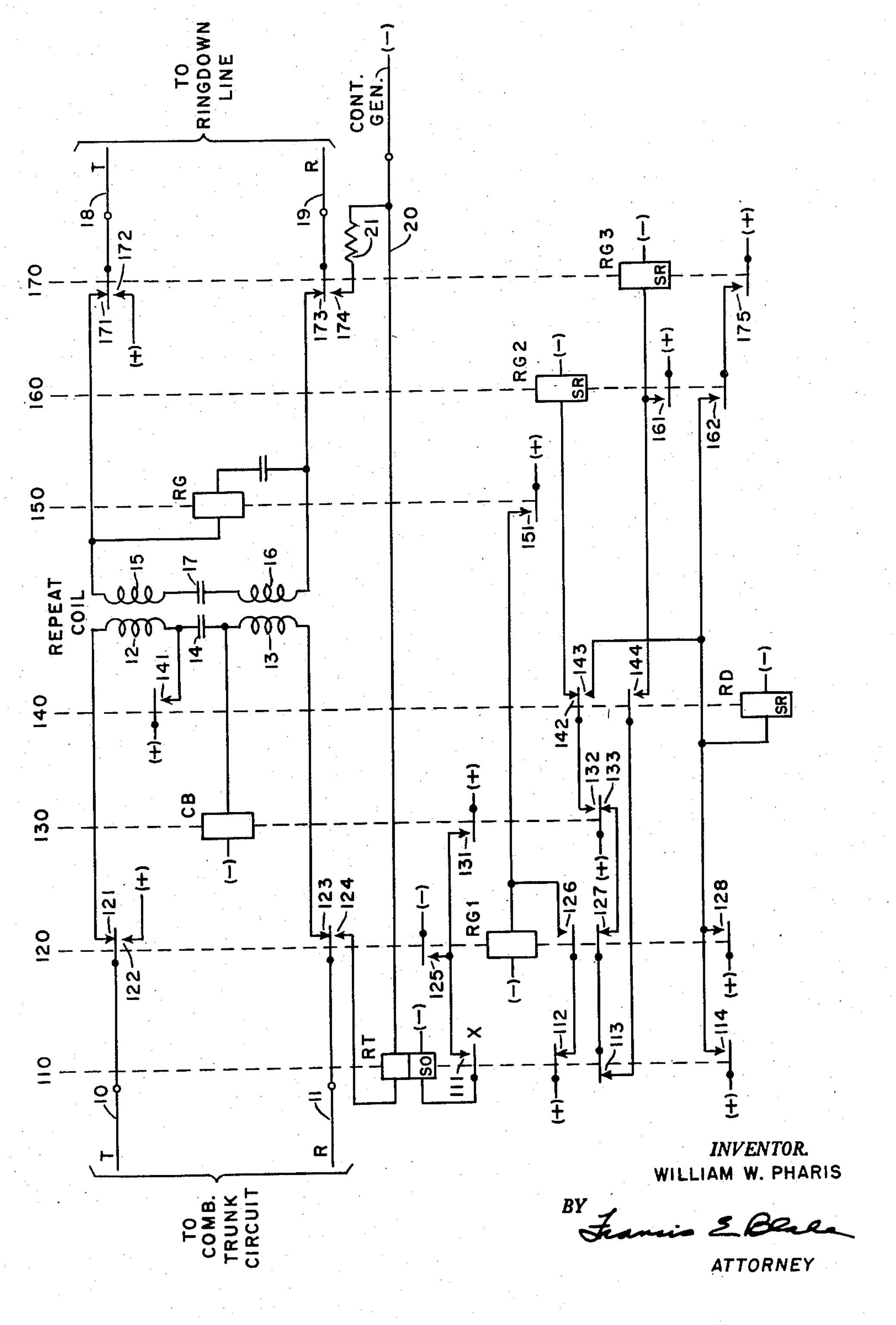
INVENTOR.
WILLIAM W. PHARIS
BY [signature]
ATTORNEY United States Patent Office 2,874,226

Patented Feb. 17, 1959

2,874,226

TRUNK ADAPTER CIRCUIT

William W. Pharis, Rochester, N. Y., assignor to General Dynamics Corporation, Rochester, N. Y., a corporation of Delaware Application September 23, 1957, Serial No. 685,444

3 Claims. (Cl. 179—43)

The present invention relates to telephone systems and, more particularly, to adapter circuits for interconnecting one type of telephone line with another type of telephone line.

Telephone systems and circuits are now so extensively developed that there are quite a few different basic types of circuits in use. In order to meet the needs of expansion without discarding circuits presently in use, it is sometimes necessary to adapt the circuit of one type that is in use for operation with another circuit of a different type. For example, it may be desirable to interconnect a combination trunk circuit and a ring-down line and, under such circumstances, it is necessary to adapt the usual combination trunk signaling facilities to provide ring-up and ring-down signaling over the ring-down line.

It is the principal object of the present invention to provide an improved adapter circuit for interconnecting one type of telephone line to another type of telephone line.

Another object of the invention is to provide an adapter circuit for interconnecting a combination trunk circuit and a ring-down line.

Yet another object of the invention is to provide an adapter circuit to utilize the conventional signaling arrangements of a combination trunk line for purposes of interconnecting with and signaling to a ring-down line and thereby providing ring-up and ring-down signaling.

Further objects and advantages of the invention will be apparent with reference to the following specification and drawing in which the sole figure is a schematic wiring diagram of the adapter circuit of the invention.

Referring to the drawing, it should be understood that the subject circuit is arranged to be energized from the station power supply which is normally a battery providing forty-eight volt potential, and the terminals of the battery are shown connected to the circuit relays with the polarity as indicated and referred to as battery for the negative terminal and ground for the positive terminal. The tip and ring conductors 10 and 11 appearing at the upper left-hand corner of the drawing are the conventional combination trunk circuit conductors which extend to a combination trunk circuit at the remote end (not shown). The tip and ring conductors 10 and 11 are normally connected through normally closed contacts 121 and 123 to the repeat coils 12 and 13 and the capacitor 14, thus providing a normally closed alternating current path for transmission of speech signals. Similarly, the other repeat coils 15 and 16, together with capacitor 17, are connected in series with the outgoing tip and ring conductors 18 and 19 through the normally closed relay contacts 171 and 173. Thus, it will be seen that the adapter circuit of the invention normally provides for transmission of alternating current, i. e., speech currents between the trunk line tip and ring conductors 10 and 11 and the ring-down line tip and ring conductors 18 and 19.

When the adapter circuit of the invention is seized for communication between the combination trunk circuit line and the ring-down line, it is necessary to signal the ring-down line in the conventional ring-up manner by momentarily applying ringing current from the continuous generator lead 20 to the ring conductor 19 of the ring-down line. In order to apply the ringing current, a direct current signaling potential with a positive polarity is applied to the trunk line ring conductor 11 at the combination trunk circuit (not shown) and the CB relay 130, therefore, operates through the obvious circuit including the repeat coil 13 and normally closed contacts 123 from battery to ground. The operation of the CB relay 130 closes contacts 132 to connect ground through normally closed contacts 142, ring 2 relay 160, and battery, thus causing the relay 160 to operate. While the ring 2 relay 160 is operated, contacts 161 are closed to complete an obvious operating circuit for ring 3 relay 170 which thereupon operates to open contacts 171 and 173 and close contacts 172 and 174 and thereby connect the continuous ringing generator signal from conductor 20, through resistor 21, closed contacts 124, and tip and ring conductors 18 and 19 of the ring-down line, thus providing a ring-up signal. The operation of the ring 3 relay 170 closes contacts 175 to extend ground through operated closed contacts 162 to the release delay relay 140 and battery. Thereupon, the release delay relay 140 operates to open contacts 142 and close contacts 143 establishing a holding ground for the RD relay through operated contacts 132. The opening of contacts 142 opens the circuit to the ring 2 relay 160 which being a slow release relay, starts to restore. Upon complete restoration of the ring 2 relay 160, the operating circuit for the ring 3 relay 170 is open at then opened contacts 161 causing this relay to restore and reclosing the tip and ring conductors 18 and 19 of the ring-down line to the repeat coils 15 and 16 through then closed contacts 171 and 173. Thus, the ring-up signal from the continuous generator as previously applied through operated contacts 174 is terminated.

It will be noted that with the release delay relay 140 operated and operated contacts 141 thereby closed, that the calling bridge relay 130 is maintained operated by the loop across the combination trunk tip and ring conductors 10 and 11 even after the previously mentioned direct current signal applied to the ring conductor 11 is removed. Should it be desirable to reapply the ring-up signal to the ring-down line, it is only necessary to momentarily open the loop across the trunk line tip and ring conductors 10 and 11 causing the calling bridge relay 130 to momentarily restore. The momentary restoration of the calling bridge relay 130 closes contacts 133 to extend ground through normally closed contacts 127, 113 and operated contacts 144 to the ring 3 relay which thereupon again operates to apply continuous generator through operated contacts 174 to the ring conductor 19 of the ring-down line. As previously mentioned, the ring 3 relay is a slow release relay so, therefore, upon the reoperation of the calling bridge relay 130, the ring 3 relay slowly restores thus assuring a period of operation for reconnecting the ring-up signal.

When it is desired to extend a call in the other direction from the ring-down line conductors 18 and 19 to the combination trunk circuit 10 and 11, the conventional application of ringing current for such seizure signaling purposes as applied to the tip and ring conductors 18 and 19 causes the alternating current ring relay 150 to operate, which closes contacts 151. The closing of contacts 151 establishes an obvious operating circuit for the ring 1 relay 120 which thereupon operates and locks to ground through normally closed contacts 112 and its operated contacts 126. The operation of the ring 1 relay 120 opens contacts 121 and 123 and closes contacts 122 and 124 to connect the continuous generator in conductor 20 through the upper winding of the ring trip relay 110, closed contacts 124, ring conductor 11, combination trunk circuit and tip conductor 10 to the closed contacts 122 and station ground. The operation of the ring 1 relay 120 also closes contacts 128 to provide an obvious energizing circuit for the RD relay 140 which thereupon operates to close contacts 141, 143, and 144 and open contacts 142. The ring trip relay 110 does not operate at this time since its direct current operating circuit is not completed until the called party answers to close the direct current loop circuit through the combination trunk circuit (not shown). When the call is answered, however, the ring trip relay 110 operates from ground through closed contacts 122, tip conductor 10, the combination trunk circuit (not shown), ring conductor 11, closed contacts 124, and station battery on the continuous generator conductor 20.

The ring trip relay 110, upon operating, closes preliminary make contacts 111 to lock the operation of the ring trip relay through the ground established through normally closed contacts 131 and operated contacts 111. The operation of the ring trip relay 110 opens contacts 112 which opens the holding circuit for the ring 1 relay 130 which thereupon releases, it being assumed that the alternating current ringing relay 150 has previously restored upon the termination of the ringing current signaling across conductors 18 and 19. Also, the operation of the ring trip relay 110 closes contacts 114 to establish a secondary holding circuit for the release delay relay 140 even though the ring 1 relay is now restored and contacts 128 are, therefore, open. Also, the restoration of the RG1 relay 130 to reclose contacts 121 and 123 while the RD relay 140 is operated, as previously described, establishes an operating circuit for the calling relay 130 from station ground through operated contacts 141, repeat coil 12, normally closed contacts 121, the loop of the combination trunk circuit, over tip conductor 10 and ring conductor 11, normally closed contacts 123, repeat coil 13, and the calling bridge relay 130 to battery. However, the operation of the calling bridge relay through normally closed contacts 123 does not at this time cause any operation of the ring 2 relay 160 since its operating circuit is open at the operated open contacts 142 of the release delay relay 140. Thus, a final holding ground is established for the release delay relay 140 through then operated contacts 132 and 143 so that a subsequent restoration of the ring trip relay 110 will not release the circuit. The ring trip relay 110 restores after the ring 1 relay restores when the contacts 124 are thereby opened.

To subsequently release the circuits, the loop across the conductors 10 and 11 at the combination trunk circuit is opened in a conventional manner causing the calling bridge relay 130 to restore, which releases the last holding ground for the release delay relay 140, which also similarly restores. In releasing the circuits under these conditions, however, the restoration of the CB relay 130 before the slow release RD relay restores, causes the ring 3 relay 170 to be momentarily operated by ground extended through normally closed contacts 133, 127, 113 and operated contacts 144. In such manner, the ring-down signal to the ring-down line is provided.

It will be noted, as described above, that at the time of signaling the ring-down line when extending a call from the combination trunk circuit to the ring-down line, the tip and ring conductors 18 and 19 are momentarily disconnected to open the alternating current transmission circuit at contacts 171 and 173, while contacts 172 and 174 are simultaneously closed to connect the continuous generator for the ringing purpose. On the other hand, when signaling from the ring-down line to the combination trunk circuit for seizure or signaling purposes, the tip and ring conductors 10 and 11 are momentarily disconnected to open the alternating current transmission circuit at contacts 121 and 123 and the continuous generator is applied through closed contacts 122 and 124. Thus, the combination trunk circuit type of lines is effectively interconnected with the ring-down line to provide two-way signaling and operation.

Various modifications may be made within the spirit of the invention and the scope of the appended claims.

What is claimed is:

1. An adapter circuit for interconnecting a combination trunk line and a ring-down line for extension of calls therebetween comprising, a coupling device for normally connecting said trunk line to said ring-down line for the transmission therebetween of alternating current only, a source of ringing voltage, first means responsive to the application of a direct current potential to said trunk line to be operated for momentarily disconnecting said ring-down line from said coupling device and at the same time connecting said source to said ring-down line, and second means to be operated by the application of an alternating current to said ring-down line while said ring-down line is normally connected to said coupling device for thereby disconnecting said trunk line from said coupling device and applying a ringing voltage to said trunk line.

2. An adapter circuit for interconnecting a combination trunk line to a ring-down line for extension of calls therebetween comprising, a coupling device for normally connecting said trunk line to said ring-down line for the transmission therebetween of alternating current only, a source of ringing voltage, first means responsive to the application of a direct current potential over one of the conductors of said trunk line to be operated for momentarily disconnecting said ring-down line from said coupling device and at the same time connecting said source to said ring-down line, and second means to be operated by the application of an alternating current to said ring-down line while said ring-down line is normally connected to said coupling device for thereby disconnecting said trunk line from said coupling device and applying a ringing voltage to said trunk line.

3. An adapter circuit for interconnecting a combination trunk line and a ring-down line for extension of calls therebetween comprising, a coupling device for normally connecting said trunk line to said ring-down line for the transmission therebetween of alternating current only, a source of ringing voltage, first means responsive to the application of a direct current potential to said trunk line to be operated for momentarily connecting said source to said ring-down line, second means to be operated by the application of an alternating current to said ring-down line while said ring-down line is normally connected to said coupling device for thereby disconnecting said trunk line from said coupling device and applying a ringing voltage to said trunk line, third means responsive to answer by said called trunk line for disconnecting the application of ringing voltage by said second means, and fourth means responsive to disconnect by said trunk line for momentarily connecting said source of ringing current to said ring-down line.

References Cited in the file of this patent

UNITED STATES PATENTS

| | | |
|---|---|---|
| 1,615,956 | Rogers | Feb. 1, 1927 |
| 1,629,008 | Smith | May 17, 1927 |
| 2,260,722 | Low | Oct. 28, 1941 |
| 2,516,814 | Voss | July 25, 1950 |
| 2,735,898 | Bartha | Feb. 21, 1956 |